United States Patent [19]
Sordello et al.
[11] 3,737,883
[45] June 5, 1973

[54] LINEAR POSITIONING APPARATUS FOR MEMORY DISC PACK DRIVE MECHANISMS

[75] Inventors: Frank J. Sordello; In W. Ha, both of San Jose, Calif.
[73] Assignee: Information Storage Systems, Inc., Cupertino, Calif.

[22] Filed: Aug. 18, 1971
[21] Appl. No.: 172,781

[52] U.S. Cl. ....................340/174.1 C
[51] Int. Cl. ....................G11b 5/56
[58] Field of Search ....................340/174.1 B, 174.1 C; 179/100.2 MD, 100.2 S

[56] References Cited

UNITED STATES PATENTS

| | | | |
|---|---|---|---|
| 3,404,392 | 10/1968 | Sordello | 340/174.1 C |
| 3,576,553 | 4/1971 | Hertrich | 340/174.1 B |
| 3,534,344 | 10/1970 | Santana | 340/174.1 C |
| 3,544,980 | 12/1970 | Applequist et al. | 340/174.1 C |
| 3,597,750 | 8/1971 | Bronner | 340/174.1 C |

*Primary Examiner*—Vincent P. Canney
*Attorney*—C. Michael Zimmerman and Gerald L. Moore

[57] ABSTRACT

A position sensing and positioning system is described which is particularly applicable to the precise positioning of read/write heads of a random access data storage device to disc recording surfaces. The system includes sensors capable of generating undistorted cyclic signals which are linearly proportional at any given time to the relative positioning of the heads with respect to the disc surfaces. Such cyclic signals are combined to provide a triangular vs. spatial position control signal for regulating a mechanical moving device for the heads, and a comparator is included to determine the slope of the signal at each of its states representative of the positions at which it is desired that the heads be located relative to the discs. A polarity reversal switch is provided for changing the polarity of the control signal as necessary for it to properly regulate the mechanical moving device.

16 Claims, 6 Drawing Figures

INVENTOR.
Frank J. Sordello
BY In W. Ha
C. Michael Zimmerman
ATTORNEY

INVENTOR.
Frank J. Sordello
BY In W. Ha
ATTORNEY

LINEAR POSITIONING APPARATUS FOR MEMORY DISC PACK DRIVE MECHANISMS

CROSS REFERENCE TO RELATED APPLICATION

This application is directed to an invention related to that disclosed and claimed in commonly owned and copending U.S. Pat. Application Ser. No. 63,508 filed Aug. 13, 1970 in the name of T. W. Martin et al., for "Position Sensor" and now abandoned.

BACKGROUND OF THE INVENTION

The present invention relates to apparatus for precisely positioning a data transfer device, such as a read/write head, with respect to a data storage device, such as a memory disc pack, at a desired one of a plurality of relative positions.

As the speed of computer processing units has increased, there has been a strong demand that the speed with which data or information is transferrable between data storage devices and a computer be correspondingly increased. For this reason, direct access data storage devices of the type employing a pack of rotating magnetic discs for memory are being widely adopted. Such devices have the advantage of enabling information to be either transferred to, or removed from, randomly selected locations or tracks without the necessity of the device having to serially "seek" the desired location such as must be done with, for example, magnetic tape memories.

It will be appreciated that for a random access disc pack storage device to be effective, it must be capable of quickly and precisely positioning read/write heads with respect to the recording discs at specified address locations. For this reason, relatively sophisticated position sensing systems, such as that disclosed in the above copending application have been developed. Such systems rely on the use of sensors of one sort or another to generate one or more electrical position signals representative of the position at any given time of the read/write heads with respect to the recording discs during relative motion of the two. Such signals can then be used to produce a control signal suitable for introduction into a servo mechanism to position the heads at the desired location with respect to the discs.

There has not only been a demand that the access speed of data storage devices be increased, but also a strong demand that the capacity, i.e., the amount of data or information which can be stored in a given size area, be correspondingly increased. With respect to disc pack types of memories, this can be accomplished by increasing the number of tracks on which data can be stored. Any such increase in the track density will, of course, require that the system for positioning the read/write heads with respect to the disc be correspondingly more precise to provide the necessary discrimination between adjacent tracks. However, the electronics involved in sensing the position of the heads and providing a suitable control signal for the positioning servo mechanism have hampered obtaining the desired closer spacing of the tracks. For example, as is brought out in the last paragraph of the specification of the above copending application, the cyclic variations in the position signals produced by the arrangement disclosed are non-linear, rather than linear variations of the triangular waveform. Thus, such signals do not truly represent the actual desired positioning of the read/write heads with respect to the recording discs at any given time. While in the arrangement described in the application, the distortions do not detrimentally affect the control signal ultimately generated because only states of the signal which are spaced a full cycle apart are utilized, such distortions can be of significance if more precise positioning is required.

It should be noted that the above problems cannot be obviated merely by "compressing" the position signal so that the states thereof representative of the track locations are closer together. There are other factors, such as compensation for temperature differential expansion between the read/write heads and the recording disc, which require that the cyclic position signals have certain slope and range characteristics which would not be obtained if the signal was compressed to any appreciable extent.

SUMMARY OF THE INVENTION

The present invention is a position sensing and positioning system which enables such a precise positioning between a data transfer device and a data storage device that the density of track locations can be doubled. The invention accomplishes this result without the necessity of having to compress the electronic signals representative of the positions. As one particularly salient feature of the invention in its accomplishment of the above, it includes a position sensing means which provides a position signal having states equally spaced apart therealong to be linearly proportional to the spacing between the equally spaced relative positions of the transfer device to the data storage device. That is, the means producing the position signal provides a signal which is not distorted at the points of interest thereof. Most desirably, the means which produces the position signal provides such a signal which is not distorted, relative to the actual positioning of the transfer device with respect to the data storage device, at any place between the desired relative positions, as well as at the desired relative positions. Such signal is then optimally conditioned to provide the proper feedback to lock the positioning means on a desired one of the relative positions.

As another salient feature of the instant invention, it includes means enabling utilization of one half cycle points of a positioning control signal, i.e., the signal output from the positioning transducer system, to indicate the relative positions, irrespective of whether or not the half cycle points have different slopes or other characteristics than the full cycle points. It accomplishes this by including means which determines or senses the condition of the particular characteristic of the signal which might be different for one half and full cycle points and, in response to a determination that the characteristic is in a condition different than that to which the head positioning means properly responds, converts the characteristic to the required condition so that the mechanical moving means is regulated correctly to lock the data transfer device to the desired position with respect to the storage device.

BRIEF DESCRIPTION OF THE DRAWING

With reference to the accompanying two sheets of drawing.

DETAILED DESCRIPTION OF PREFERRED EMBODIMENTS

Figure 1:
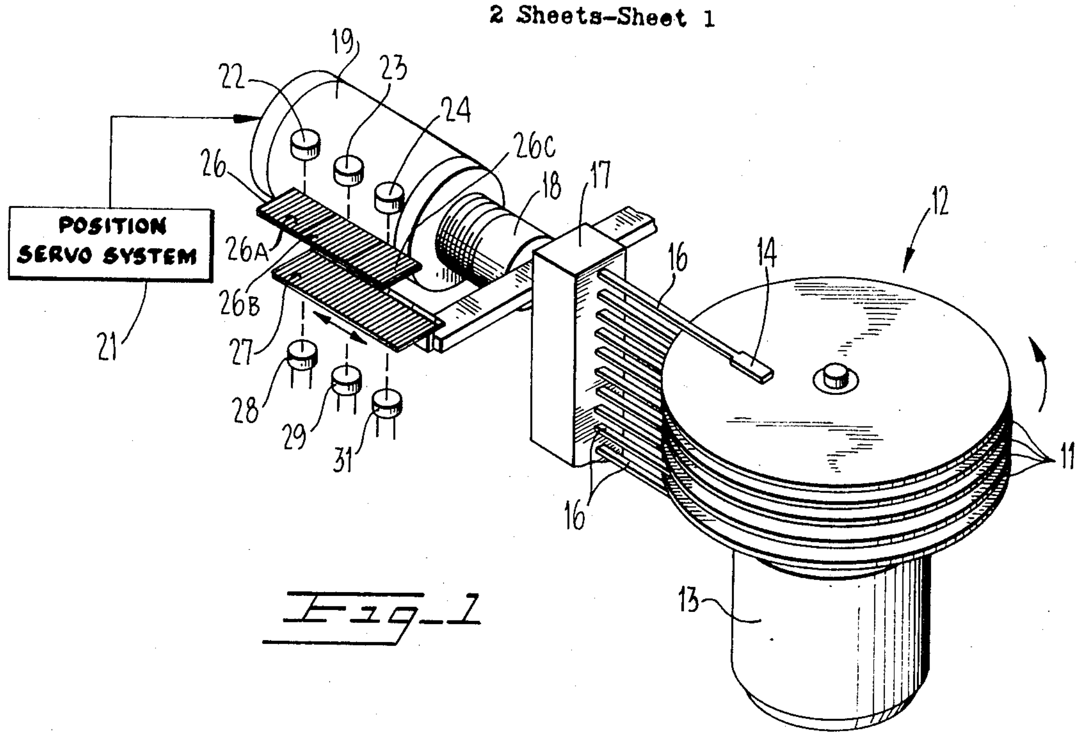
FIG. 1 is an isometric schematic view illustrating the functional components of a disc drive and recording mechanism, including a position sensing arrangement to which the invention is particularly applicable.

FIG. 1 illustrates a data storage and recording apparatus of the type to which the present invention is particularly applicable. Such apparatus includes a plurality of recording discs 11, each of which has its planer surfaces coated with a magnetic material, which are coaxially secured together to form a so-called disc pack 12. In use, the disc pack 12 is axially rotated, such as by a motor 13, and data is selectively transferred onto or from tracks on the individual disc surfaces by corresponding data transfer devices in the form of read/write heads 14. A head 14 is provided for each active disc surface and is mounted on the free end of a support arm 16 therefor cantilevered from a carriage 17.

The carriage 17 is secured to the moving coil 18 of an electromagnetic actuator 19. The actuator 19 is energized by a position servo system, represented diagrammatically in FIG. 1 by block 21, to translate carriage 17 and, hence, the read/write heads 14, radially of the disc pack 12 and hold the same at various radial locations with respect to the disc surfaces. Each radial location, i.e., relative position of the heads with respect to the disc surfaces corresponds to a closed path or track of each head over its associated disc surface formed upon rotation of the pack. Data is transferable to and from each head and its corresponding disc surface on each one of such tracks.

It will be appreciated that the amount of data which can be stored on any particular disc surface will depend upon the number of tracks which can be contained on the surface. The number of tracks or, in other words, track density is, of course, determined by the number of relative positions at which the heads 14 can be located with respect to each of the disc surfaces by the electromagnetic actuator 19. In the past, track densities in the order of 100 tracks per inch have been quite acceptable. However, present day use of computers and other data manipulation devices for many complex operations has created a strong demand for more storage capacity.

The preciseness with which the read/write heads of a disc pack storage and recording mechanism can be positioned with respect to the disc pack surfaces plays a large part in determining the obtainable track density. In this connection, an optical sensing system of the type disclosed in the previously mentioned copending application Ser. No. 63,508 is capable of quite quickly providing very precise sensing of the positioning of the heads with respect to the discs at any given time. The present invention also utilizes a sensing system of this type. As is disclosed in the copending application, as well as is shown in FIG. 1 hereof, such system includes a plurality of light sources which cooperate with grating assemblies and optical sensors to generate signals indicative of the relative positioning of the heads to the discs. More particularly, with reference to FIG. 1, three light sources 22, 23, and 24 are positioned to transmit light through grating assemblies 26 and 27 for impingement on corresponding optical transducers 28, 29 and 31, respectively. Each of the grating assemblies 26 and 27 is made up of a glass plate which is masked with closely spaced parallel lines to thereby create alternate opaque and transparent areas. Grating assembly 27 is mounted on carriage 17 for movement therewith as is indicated by arrow 32, whereas grating assembly 26 is rigidly fixed with respect to movement of such carriage 17. As is explained in the copending application, movement of grating 27 with respect to grating 26 will provide a shutter effect as the grating lines of the two assemblies alternately become aligned and misaligned with respect to one another. The intensity of the light which is transmitted through the gratings from each source to its associated sensor will be correspondingly increased to a maximum and decreased to a minimum. This will, in turn, cause each phototransducer to generate an alternately increasing and decreasing signal having a generally triangular waveform indicative of the relative positioning of the two gratings and, hence, indicative of the relative positioning of the heads 14 with respect to the discs 11. It is to be noted that the triangular waveform is a spatially dependent waveform rather than a time dependent waveform as one might be originally inclined to conclude.

As is also brought out in the copending application, the grating lines on one of the assemblies, e.g., grating assembly 26, are divided into three segments, 26A, 26B and 26C. The lines of each segment are spaced apart the same distance as the grating lines of the assembly 27, but are in different spatial phase relationships with respect to one another. More particularly, the lines of segment 26B and the lines of segment 26C are respectively 90° and 180° spatially out of phase with respect to the lines of segment 26A. The signals generated by the optical transducers 28, 29 and 31 will be correspondingly out of phase with respect to one another by these relationships.

Each of the signals generated by the transducers 28–31 will be indicative of the relative positioning of the read/write heads to the recording discs. The outputs of two of such transducers are combined, though, to provide a more precise indication of the relative positions. That is, the outputs from transducers 28 and 31 which are spatially 180° out of phase with respect to one another are summed to provide null points at their points of equal amplitudes. It is these null points which are utilized by the position servo system 21 in the instant invention to represent various positions of the heads 14 relative to the disc surfaces.

Figure 2:
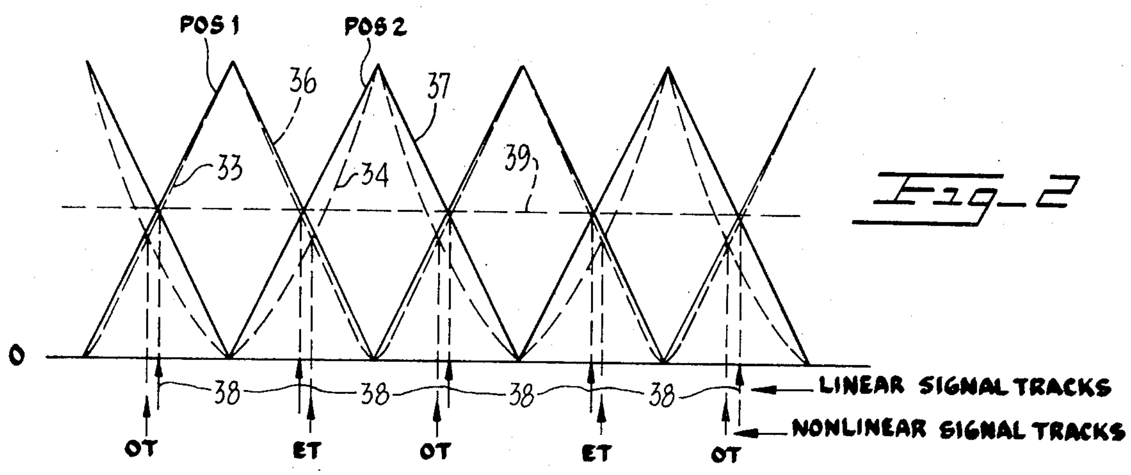
FIG. 2 is a composite view of a plurality of position signals, including position signals in solid lines formed with the present invention and including for comparison in dotted lines typical distorted position signals.

FIG. 2 illustrates in solid lines position signal tracings of the current generated by each of the transducers 28 and 31, as well as dotted line similar tracings provided in prior systems of this type, such as that disclosed in the copending application. Prior systems have generally used phototransistors as the sensing systems. Typical signal tracings provided by such transducers are referred to in FIG. 2 by the reference numerals 33 and 34. It will be noted that although each of these tracings has the general form of a triangular wave, the tracing itself is curved between its points of maximum and minimum. This represents the non-linearity or, more broadly, distortion in the signal. That is, the actual change in the positioning of the stationary grating segments 26A and 26C with respect to the grating assembly 27 upon movement of the heads 14 with respect to the disc surfaces will provide light transmission to the transducers 28 and 31 will vary linearly between such maxima and minima. However, the phototransistors providing the current output will provide a distorted current signal as illustrated in view of the fact that the current gain of transistors is a function of the collector current.

As mentioned previously, it is the points at which the two signals have equal amplitudes, i.e., their points of intersection, which provide the signal states useable for representing the various relative positions of the read/write heads to the disc surfaces. Because of the distortion of the signals, though, such points will not be equally spaced apart along the abscissa axis. This can be seen by referring to the various reference lines marked "OT" (odd track) and "ET" (even track). As is illustrated, the spacing between each OT and ET, when taken from the left to the right, is greater than that between each ET and OT. In prior arrangements, though, this distortion did not affect the readings since it was only every other intersection, e.g., the even track intersections, which were utilized to represent track positions of the head with respect to the discs. Because each full cycle of each triangular waveform is the same as every other cycle thereof, the distortion in the signal will only result in the shifting of all of the even track positions in one direction, rather than affecting the spacing therebetween. Such shifting of all the even track positions in one direction can be corrected by appropriately aligning the heads during initial set-up.

In accordance with the instant invention, it has been found that every intersection of the signals can be used to represent a relative position of the heads to the disc surfaces if certain criteria are met. For one thing, the spacing between all of the various intersections must be equal. Most simply, this equal spacing is obtained by having the signals which are generated to indicate the positions be linearly proportional to the light received thereby and, hence, the relative positions of the heads 14 to the discs. The position signals 36 and 37 in FIG. 2 represent such linearly proportional signals traces. It can be seen that the points of intersection thereof, all of which are denoted by the reference numeral 38, are equally spaced apart and provide the desired equally spaced states representative of the track positions.

Although as stated above the equally spaced states of the position signal traces is most simply obtained by providing optical transducer means whose output will be linearly proportional to the light received thereby, from the broad standpoint this is not necessary. Such equally spaced apart states will also be provided, for example, by a cyclical signal, such as a sine wave, having any one half of a whole waveform symmetrical with the other half thereof around a plane of symmetry extending in the direction of the wave, such as the plane denoted by the dotted symmetry plane line 39. In this connection the terms "symmetry" and "symmetric" as used herein are meant to include reverse symmetric arrangements such as a triangular wave, saw-tooth wave and a sine wave.

Figure 4:
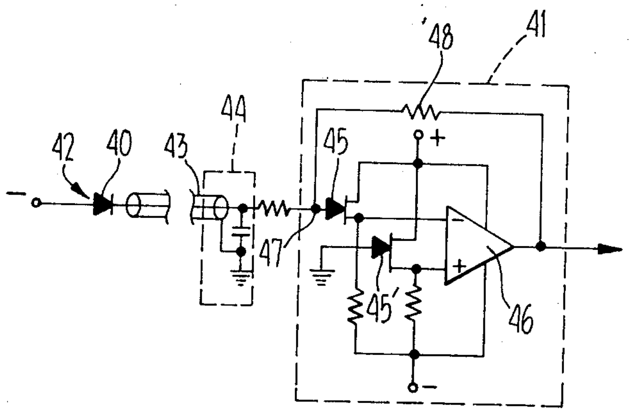
FIGS. 4 and 5 are alternate preferred embodiments of optical sensing transducers utilized in the present invention to provide undistorted position signals.
Figure 5:
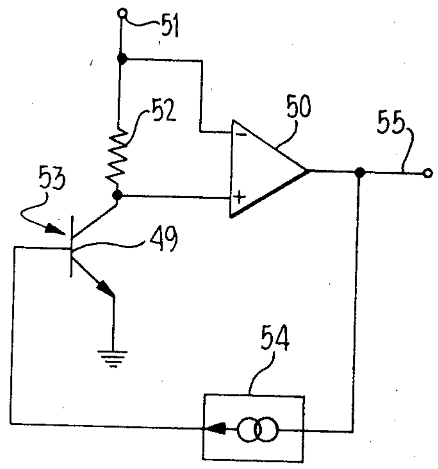

FIGS. 4 and 5 illustrate alternate embodiments of optical transducer means which will provide the desired undistorted signals 36 and 37. With reference first to FIG. 4, a photodiode 40 is shown in series with a high gain, high input impedance amplification arrangement 41. The current generated by a photodiode, i.e., the current generated at the base-collector junction by light incident thereon such as is represented by arrow 42, is typically within ±½ percent linearly related to the amount of light received. However, such generated current is quite small, i.e., generally around one-hundreth of that provided by a comparable phototransistor. Thus, a shielding and amplification arrangement is required to protect the signal and properly amplify it for use. More particularly, the signal from the photodiode is fed via a protective shielded cable 43 and a high frequency filter 44 to the amplification arrangement 41. Such arrangement includes a pair of appropriately powered source followers 45 and 45' which provide a buffering means between the signal and the input terminals of a difference amplifier 46. The base of follower 45' is grounded to thereby provide a virtual ground at terminal 47 so that the full and non-distorted signal from photodiode 42 is made to appear across resistor 48, thus generating a voltage output signal from amplifier 46 which is, as desired, linearly proportional to the current signal from the photodiode.

FIG. 5 illustrates another optical transducer providing an output linearly proportional to the amount of light incident thereon. More particularly, a phototransistor 49 of a conventional NPN type is shown in combination with a base current feedback arrangement which linearlizes its output. That is, the collector of the transistor is connected to the positive input terminal of a difference amplifier 50 and the emitter thereof connected to ground. A reference potential difference is made to appear between the input terminals of the amplifier by applying a constant potential to terminal 51 which causes a voltage drop across resistor 52 between such terminals. The phototransistor will thus act, in effect, as a null detector. That is, light incident thereon, represented by the arrow 53, will generate a base current which produces an error signal at the positive terminal of the difference amplifier. The resulting voltage at the amplifier output is used to drive a current generator 54 which is connected to the transistor base to drive the base current by an amount which is equal and opposite to that of the current generated therein by the incident light. This will linearize the consequent voltage caused at terminal 52 of the difference amplifier.

Figure 3:
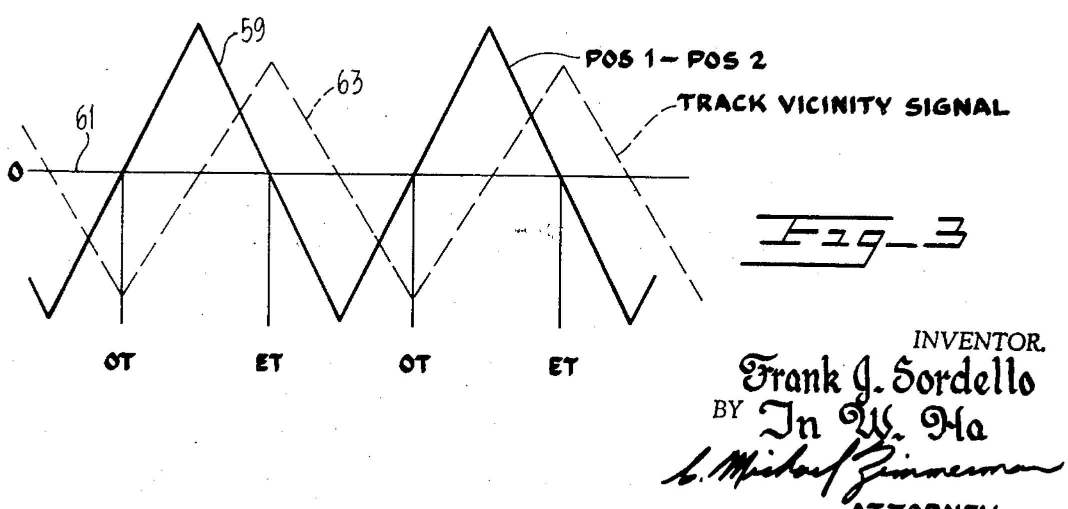
FIG. 3 shows a composite control signal obtainable from the undistorted position signals of FIG. 2, as well as a track vicinity signal which is generated to aid in determining the condition of any particular state of the control signal representative of a desired relative position of the read/write heads to the recording discs.
Figure 6:
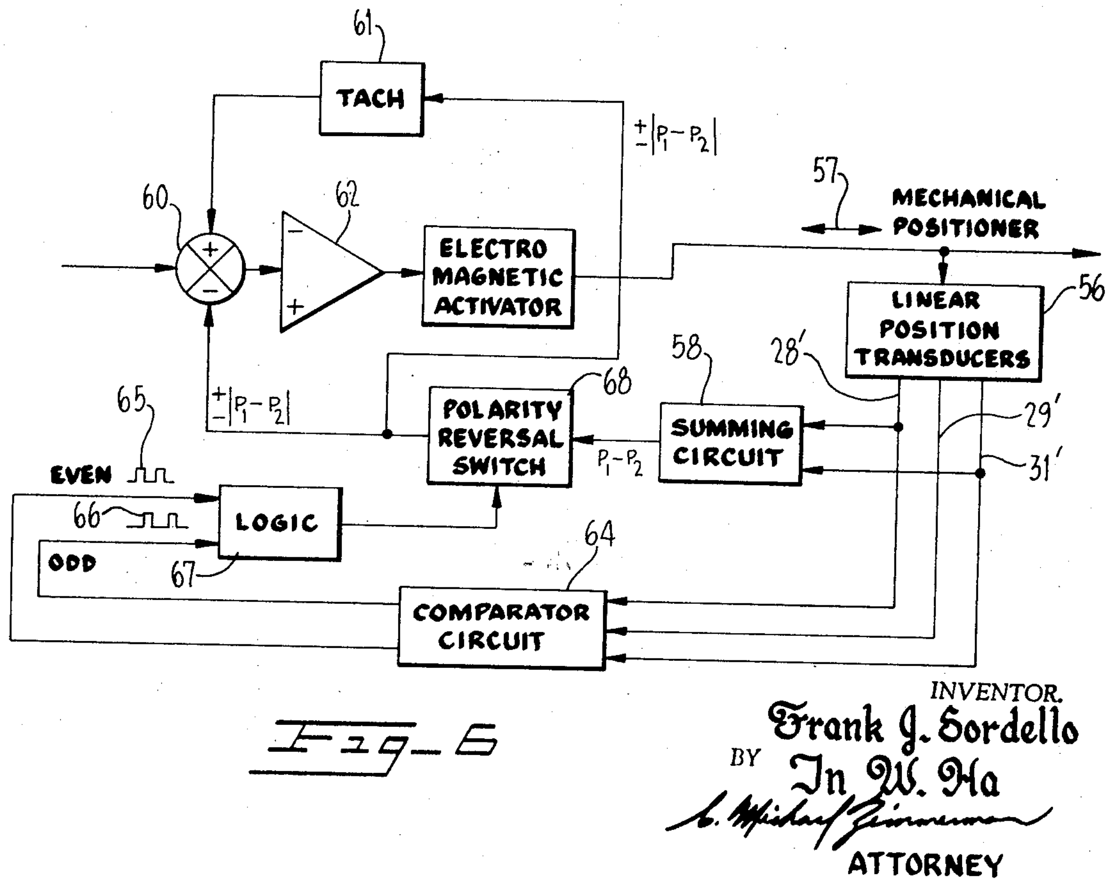
FIG. 6 is a block diagram of a preferred embodiment of a position sensing and positioning apparatus of the invention.

FIG. 6 diagrammatically illustrates the position sensing system and positioning apparatus of the invention utilizing linear transducers and having other features for altering the signal thereby; enabling the use of every intersection point or state of the linear signals 36 and 37 in order that the track density can be doubled. More particularly, the three optical position transducers 28–31 are represented in the figure by block 56, and the mechanical motion providing the varying light intensities received thereby is represented by the arrow 57. The output from linear transducers 28 and 29 is fed via leads 28' and 31' to a summing circuit 58 which subtracts one from the other to provide a composite control signal trace. Such trace is denoted by the reference numeral 59 in FIG. 3. As is illustrated in such figure, this composite signal has the same waveshape form as each one of the position signals 36 and 37, except that the zero reference line 61 now coincides with its plane of symmetry. It is thus seen that the equally spaced states therein are null points which are discernible quite easily electronically.

In a conventional system, this composite control signal 59 would be directly used to operate a position servo system to properly position the heads 14 to the surfaces of the discs 11. The control signal, in the form in which it emanates from the summing circuit 58, would be fed to one side of a summing junction 60. Such signal would also be used by the block 61 labelled "tachometer" to provide a representation of the velocity of approach to the null point. Such tachometer can be one such as that disclosed in U.S. Pat. No. 3,568,059 issued March 2, 1971 to Frank J. Sordello for "Electronic Tachometer." The tachometer signal would be applied to the other side of the summing junction 60 which would compare the same with the control signal and any other incoming signals to provide a signal to amplifier 62 which would, in turn, generate an output signal to regulate the electromagnetic actuator to precisely position the heads 14 at the desired track position with respect to the disc surface.

As mentioned previously, there are factors other than signal distortion which have inhibited the utilization of every equally spaced state or null point of a control signal, such as that represented by tracing 59, to position the heads at the proper locations. More particularly, it will be noted that the slope of the control signal alternates between a positive slope at the "odd track" null points and a negative slope at the "even track" null points. These opposite polarity conditions of the slope characteristics of a portion of the signal prevent the signal from correctly operating a position servo system to provide the desired positioning. That is, the servo system is responsive to a comparison of the control signal with its slope, when the slope has a first proper polarity by providing movement of the heads toward the desired relative position with respect to the disc surfaces. However, when the slope has the opposite polarity, the servo system its responsive to a comparison of the control signal with its slope by actually moving the heads away from the desired position.

As a salient feature of the instant invention, it includes means for determining the condition of the slope of the control signal at each of the null points and converting such slope, if necessary, to the proper polarity for correct operation of the servo system. More particularly, the outputs of the transducers 28 and 31 are compared with the output of transducer 29. As mentioned previously, the output of this latter transducer is 90° out of phase with the output of transducer 28. The signal therefrom is illustrated in dotted lines as signal trace 63 in FIG. 3. Because of its 90° phase relationship with respect to the outputs of transducers 28 and 31, the minima and maxima of such signal will alternately coincide with the null points provided by subtracting the signal from transducer 29 from the signal of transducer 28. Thus, the minima of such signal will represent those null points of the signal 59 having one slope polarity whereas the maxima thereof will represent those null points having the opposite slope polarity.

The output from the three transistors is fed via lines 28', 29' and 31' to a comparator circuit which is represented by block 64 in FIG. 6. Such circuit combines and compares the transducer outputs to generate therefrom two pulse outputs, one of which represents the odd track null points and the other of which the even track null points. Such comparator circuit is most simply the circuit described in the copending application Ser. No. 63,508 for generating track and one half track position pulses. Such pulses, represented in FIG. 6 at 65 and 66, are fed into discrimination logic 67 and utilized to provide the desired reversal of the polarity characteristics of the control signal. That is, its output is fed to a polarity reversal switch 68 which reverses such polarity as is necessary to assure proper operation of the position servo system. Thus, insofar as the position servo system is concerned, the control and tachometer signals applied to the summing junction have the proper polarity relationship to generate the correct output signal for controlling the electromagnetic actuator.

While the invention has been described in connection with preferred embodiments, it will be appreciated by those skilled in the art that various changes and modifications can be made without departing from its spirit. For this reason, the protection afforded applicants is to be considered limited only by the claims and their equivalents.

We claim:

1. Apparatus for precisely positioning one member with respect to another at a desired one of two adjacent relative positions selected from a plurality of such positions comprising means for mechanically moving one of said members with respect to the other; means for generating a control signal for said mechanical moving means having two states respectively representative of said two adjacent positions with each of said states having a characteristic in a different condition than the other, servo means responsive to said control signal by regulating said mechanical moving means to cause the same to position said one of said members at the desired position with respect to the other, said servo means providing said positioning of said member at the desired position only in response to said characteristic of the signal state representative of the desired position having one of said different conditions; means for determining the condition of said characteristic of the signal state representative of the desired position; and means responsive to a determination that said condition is different than that to which the servo means properly responds by converting said characteristic to the correct condition prior to introduction of said control signal to said servo means, whereby said servo responds to said control signal to provide proper regulation of said mechanical moving means irrespective of the condition of said characteristic of the signal state representative of the desired position.

2. The apparatus of claim 1 for precisely positioning one member with respect to another wherein said characteristic of each of said generated signal states is in a condition which is opposite to that of the other and said means for converting the same reverses the condition if necessary for proper regulation of said mechanical moving means.

3. The apparatus of claim 2 for precisely positioning one member with respect to another wherein said control signal is a cyclic signal with said characteristic of said signal states being the slope of said signal at the location of said states, said opposite conditions thereof being the opposite polarities of the slope.

4. The apparatus of claim 1 for precisely positioning one member with respect to another wherein said plurality of relative positions of said members are equally spaced apart and said means for generating said control signal generates such a signal having a plurality of states which are equally spaced apart therealong and each of which is representative of a corresponding one of said positions whereby the spacing of said signal states is linearly proportional to the spacing of said plurality of relative positions.

5. The apparatus of claim 4 for precisely positioning one member with respect to another wherein said means for generating a control signal generates such a signal which is cyclic with one half of any whole waveform shape thereof symmetric with the other half thereof to provide said equally spaced states representative of said equally spaced relative positions along the plane of symmetry thereof.

6. The apparatus of claim 5 for precisely positioning one member with respect to another wherein said control signal has a triangular waveform.

7. The apparatus of claim 5 for precisely positioning one member with respect to another wherein said means for generating a control signal includes a pair of transducer means, each of which is responsive to a relative movement of said two members by generating a cyclic position signal having one half of any whole waveform thereof symmetric with respect to the other half thereof and being 180° out of spatial phase with respect to the other position signal, and summing means for combining said position signals to form a composite signal for said control signal having equally spaced null points representative of said equally spaced relative positions.

8. The apparatus of claim 5 for precisely positioning one member with respect to another wherein said servo means includes means for producing a signal from said control signal representative of the velocity of movement of said two members relative to one another, and means for comparing said control signal with said signal representative of such velocity to produce an output signal which will regulate said mechanical moving means to provide said precise positioning of one member with respect to another at a desired one of said relative positions.

9. The apparatus of claim 8 for precisely positioning one member with respect to another wherein one of said members is a data transfer device of a memory storage mechanism and the other of said members is a data storage device thereof, and said adjacent relative positions of one with respect to another coincide with positions on said data storage device at which it is desired to transfer information between said data transfer device and said data storage device.

10. The apparatus of claim 9 for precisely positioning one member with respect to another wherein said means for generating a control signal includes a pair of transducer means, each of which is responsive to relative movement of said two members by generating a cyclic position signal having one half of any whole waveform thereof symmetric with respect to the other half thereof and being 180° out of spatial phase with respect to the other position signal, and comparator means for combining said position signals to form a composite signal for said control signal having equally spaced null points representative of said equally spaced relative positions.

11. In a position sensing and servo control mechanism for precisely positioning a data transfer device with respect to a data storage device at any one of a plurality of generally equally spaced relative positions, means for mechanically moving one of said devices with respect to the other through said relative positions, transducer means responsive to said movement through said relative positions by generating a position signal having a plurality of states respectively a portion of which states are representative of a portion of said relative positions, means to alter said position signal such that it includes states representative of the remainder of said relative positions, said states of said control signal being equally spaced apart therealong to be linearly proportional to the spacing between said relative positions and thereby truly representative of the locations of said relative positions, and means responsive to said position signal by regulating said mechanical moving means to cause the same to locate said one of said devices at a selected one of said positions with respect to the other.

12. The position sensing and servo control mechanism of claim 11 wherein said transducer means is responsive to said movement by generating a position which is cyclic with one half of any whole waveform shape thereof symmetric with the other half thereof to provide said equally spaced states representative of said equally spaced relative positions along the plane of symmetry thereof.

13. In a position sensing and servo control mechanism for precisely positioning a data transfer device with respect to a data storage device at any one of a plurality of generally equally spaced relative positions, means for mechanically moving one of said devices with respect to the other through said relative positions, transducer means responsive to said movement through said relative positions by generating a position signal having a plurality of states respectively representative of said relative positions, said states of said control signal being equally spaced apart therealong to be linearly proportional to the spacing between said relative positions and thereby truly representative of the locations of said relative positions, and means responsive to said position signal by regulating said mechanical moving means to cause the same to locate said one of said devices at a selected one of said positions with respect to the other, said transducer means being responsive to said movement by generating a position which is cyclic with one half of any whole waveform shape thereof symmetric with the other half thereof to provide said equally spaced states representative of said equally spaced relative positions along the plane of symmetry thereof, said transfer means including a light source, an optical transducer for reception of light from said source, and means for varying the amount of light from said source permitted to be received by said transducer in a manner directly related to the positioning at any given time of said transfer device with respect to said storage device, said optical transducer being responsive to changes in the amount of light received thereby indicative of changes in said relative positioning by generating said cyclic position signal having one half of any whole waveform shape thereof symmetric with the other half thereof.

14. The position sensing and servo control mechanism of claim 13 wherein said position signal has a triangular waveform.

15. The positioning sensing and servo control mechanism of claim 13 wherein said optical transducer is a photodiode connected in series through a high impedance buffering means with a high gain amplifier.

16. The position sensing and servo control mechanism of claim 13 wherein said optical transducer is a phototransistor connected to one of two input terminals of a difference amplifier, which terminals are normally biased equally, said phototransistor being responsive to the reception of light from said light source by generating a current causing a voltage change at said one terminal of said difference amplifier proportional to the intensity of light received by said phototransistor to thereby produce an output from said difference amplifier also representative of said light intensity, and a current generator responsive to said output by driving the base current of said phototransistor in a direction equal to and opposite to the current generated thereby by the light incident thereon to linearize the voltage output of said difference amplifier and make the same linearly proportional to the amount of light incident on said base of said phototransistor.

* * * * *